(12) United States Patent
Fuse

(10) Patent No.: US 7,440,188 B2
(45) Date of Patent: Oct. 21, 2008

(54) DIFFRACTIVE OPTICAL ELEMENT

(75) Inventor: Keiji Fuse, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 643 days.

(21) Appl. No.: 10/532,044

(22) PCT Filed: Feb. 5, 2004

(86) PCT No.: PCT/JP2004/001230

§ 371 (c)(1),
(2), (4) Date: Apr. 21, 2005

(87) PCT Pub. No.: WO2004/077115

PCT Pub. Date: Sep. 10, 2004

(65) Prior Publication Data

US 2006/0013277 A1    Jan. 19, 2006

(30) Foreign Application Priority Data

Feb. 6, 2003    (JP)    ............... 2003-029244

(51) Int. Cl.
*G02B 5/18*    (2006.01)
(52) U.S. Cl. .............. 359/569; 359/566; 359/567; 359/573
(58) Field of Classification Search ......... 359/566–576, 359/558
See application file for complete search history.

(56) References Cited

U.S. PATENT DOCUMENTS

| | | | |
|---|---|---|---|
| 5,559,724 A * | 9/1996 | Morrison | ............. 359/569 |
| 6,452,132 B1 | 9/2002 | Fuse | |
| 6,567,226 B2 | 5/2003 | Fuse | |
| 2002/0183994 A1 | 12/2002 | Fuse | |

FOREIGN PATENT DOCUMENTS

| | | |
|---|---|---|
| JP | 11-183716 | 7/1999 |
| JP | 2000-231012 | 8/2000 |
| JP | 2001-62578 | 3/2001 |
| JP | 2002-228818 | 8/2002 |

* cited by examiner

*Primary Examiner*—Joshua L Pritchett
(74) *Attorney, Agent, or Firm*—McDermott Will & Emery LLP

(57) ABSTRACT

A conventional diffractive optical element (DOE), which consists of repetition of a unit pattern Y, has an advantage of applicability of the Fast Fourier Transform algorithm to calculate diffraction beam spots intensities on lattice points on an image plane. But, the conventional DOE has a drawback of impossibility of diffracting a laser beam off the lattice points. This invention designs a DOE by giving arbitrary complex amplitude transmittance $\{t_{mn}\}$ to every pixel (m, n), calculating actual Fourier transform from $\{t_{mn}\}$ to intensity $W(\alpha, \beta)$, and obtaining intensity of a diffraction beam directing in any $\alpha$ and $\beta$ direction. Since $\alpha$, $\beta$ are not necessary to be on lattice points, the FFT is of no use. Angular resolutions U and V satisfy inequalities $U<\lambda/aR$ and $V<\lambda/bS$, where $\lambda$ is a wavelength, aR and bS are the size of the DOE. The DOE can produce multidiffracted beams anywhere on an image and can irradiate a plurality of arbitrary arranged points simultaneously with high precision. The DOE realizes precise multispot microprocessing on arbitrary positions, which is required for producing electronic parts. The DOE is suitable for high speed and low cost laser processing.

4 Claims, 5 Drawing Sheets

DOE designing (the present invention)

R × S amplitude transmittance pattern of DOE
(non-repetition of unit patterns)

directly calculating
a diffraction integral
formula $I(\alpha, \beta)$
arbitrary
angle angle spectral distribution of
diverging intensity

DOE designing by FFT (Prior Art)

DOE designing (the present invention)

diverging angle arrangement of 49 divided beams intensity distribution of incident beam designed pattern of DOE of Embodiment 1 angle spectrum intensity distribution of Embodiment 1 designed pattern of DOE of Embodiment 2 angle spectrum intensity distribution of Embodiment 2

DOE pattern of Embodiment 3

DOE pattern of Embodiment 4

DIFFRACTIVE OPTICAL ELEMENT

TECHNICAL FIELD

This invention relates to a diffractive optical element allowing a laser beam to branch into a plurality of beams and to shoot at any spots deviating from lattice points regularly assigned to an image plane and a laser machining apparatus using the same diffractive optical element, particularly, a multipoint batch laser processing apparatus used for microprocessing of electronic parts, such as perforating, welding, soldering or surface treatment.

BACKGROUND ART

[Patent Reference Document 1] Japanese Patent Publication No.2000-231012, "Method for Designing a Diffractive Optical Element"

This is one of the former inventions made by the inventor of the present invention. The application proposed a diffractive optical elements (DOE: Fraunhofer type) having functions of dividing a laser beam. The invention aimed at facilitating the designing of DOEs by assigning inherently narrow tolerance parameters with larger tolerances enlarged by the estimating designed DOEs by a merit function including influences of errors for the selected parameters. Enlargement of the tolerances makes the production of the DOEs easy.

The DOE is a set of lengthwise and crosswise aligning identical unit patterns. A unit pattern is a set of lengthwise and crosswise aligning pixels which are the smallest cell having a parameter. Since all the unit patterns are identical, the design of a DOE can be reduced to design of a unit pattern. The DOE with unit patterns diffracts a beam into a plurality of divided beams just on lattice points assumed on an image plane. The Fast Fourier Transformation (FFT) algorithm can calculate angular intensity distribution of diffracted beams separated by a DOE.

[Patent Reference Document 2] Japanese Patent No.3,346, 374, "Laser Boring Apparatus"

This is another of the former inventions made by the inventor of the present invention. The patent No. 3,346,374 proposed a laser boring apparatus for boring many holes with the same diameter at the same interval simultaneously on an object plane by dividing a laser beam into many identical separated beams and converging the separated beams by an f sin θ lens in parallel on lattice points assumed on the object plane. Coupling of a DOE (Fraunhofer type or Fresnel type) and an f sin θ lens raises position accuracy of the hole boring by the laser beams. The patent allows the apparatus to utilize higher order diffraction beams effectively without loss. The patented invention succeeds in boring many holes at a stroke and has various advantages.

In the prior invention, the DOE was defined as an optical part which includes spatial repetitions of identical unit patterns Y with a definite spatial period (interval) Λ and diffracts a laser beam into many divided beams. The DOE is made by designing a unit pattern Y, aligning H identical unit patterns Y in succession in a horizontal (x-) direction, and aligning G identical unit patterns Y in a vertical (y-) direction.

Then design of the DOE was equivalent to design of the unit pattern Y. The DOE has a set of vertically-aligning R pixels and horizontally-aligning S pixels. A pixel is a minimum part whose thickness (heights) can take one of $g=2^s$ (s: integer) different values. The full span of thickness difference of the pixels corresponds to a wavelength λ of a laser beam. Pixels C are numbered by a horizontal number m and a vertical number n ($0 \leq m \leq H$, $0 \leq n \leq G$) as C{(m, n)}. Determination of a set of thicknesses {$d_{mn}$} of $2^s$ different values for all the pixels C{(m, n)} was design of a DOE.

In practice, the design of the DOE was far more simplified. In the prior DOE, all the pixels could not take a arbitrary value of thicknesses but were ruled by a restriction condition. The restriction is the existence of a unit pattern Y. The DOE had been designed by determining thicknesses {$d_{mn}$} of a set of pixels {(m, n)} included in the unit pattern Y and by arranging repeatedly G×H identical unit patterns in x- and y-directions. The design of the DOE with very high degree of freedom could be replaced by the design of a unit pattern with low degree of freedom.

P x-direction aligning pixels and Q y-direction aligning pixels compose a unit pattern Y. The unit pattern contains PQ pixels. The number of pixels as an object of design is not the total number GHPQ of total pixels but the number PQ of pixels within a unit pattern.

A DOE has G x-aligning unit patterns and H y-aligning unit patterns. A unit pattern contains P x-aligning pixels and Q y-aligning pixels. A DOE has two-storied hierarchy. Parameters are defined here as follows.

Pixel C width (x-direction size)=a, length (y-direction size) =b.

Unit pattern Y P×Q pixels, width (x-size)=Pa, length (y-size) =Qb.

DOE G×H unit patterns, width (x-size)=GPa, length (y-size) =HQb.

DOE R×S pixels (R=PG, S=HQ)

m, n coordinates of a pixel C in a unit pattern in the prior art $d_{mn}$ thickness of a C(m, n) pixel taking one of $g=2^s$ values.

$t_{mn}$ complex transmittance of a C(m, n) pixel.

m, n coordinates of a pixel C in the whole DOE in the present invention.

p, q diffraction order parameters (integers) of the prior art

α, β diffraction angles (not integers; continual) of the present invention.

The set of notations is used throughout this description. A DOE includes RS (=PGHQ) pixels. A pixel takes one of the $g=2^s$ (s: integer) different thicknesses. The total degree of freedom of a DOE is $gRS(=2^sPGHQ)$. But, actual degree of freedom of a prior art DOE is only gPQ, since repetitions of identical unit patterns compose a prior art DOE. The practical degree of freedom for designing is equal to gPQ which is a quotient of the total freedom degree gPGHQ divided by the unit pattern number GH. What is important is the number of pixels which should be determined for designing a DOE. The pixel thickness parameter freedom g is less important here. Then, the degree of freedom for designing a DOE will signify the number of outstanding pixels (PGHQ or PQ) hereafter.

For example, assuming that a unit pattern Y includes 1000 pixels (PQ=1000) and a DOE includes 1000 unit patterns (GH=1000), the DOE includes 1000000 pixels (PQGH=1000000). However, it is unnecessary to determine thicknesses of all the 1000000 pixels. Instead, DOE designing should determine only the thicknesses of 1000 pixels. Free parameters are greatly reduced to one thousandth.

Existence of repeating unit patterns alleviates the quantity of calculation to a great extent. The repetition of identical unit patterns gives a DOE a role of a diffraction grating which allows divided light to focus only at lattice points defined on an image plane. Extra regions except lattice points are all dark. The unit patterned DOE makes only beam spots only on lattice points which are distributed at predetermined spatial intervals (periods) on an image plane. The lattice point diffraction enables the Fast Fourier Transformation (FFT) to calculate the intensity of diffracted beams at lattice points.

Use of the FFT has exquisite advantages of fast calculation of a diffracted image and facile designing of the DOE.

Furthermore, hole-boring processing, in many cases, bores many holes at lattice points aligning lengthwise and crosswise at a common interval. For example, print circuit boards sometimes require that small holes are bored to be regularly arranged at a spatial period in two dimensions.

Boring holes at lattice points fortunately corresponds to Fourier transformation of repetition of identical unit patterns. The FFT is a suitable calculation of the lattice point boring. Strictly speaking, since sine functions ($\sin \theta$) of diffraction angles $\theta$ are multiples of a unit value, an $f \sin \theta$ lens instead of an ordinary $f \tan \theta$ lens allows the DOE to make lattice point diffraction. The lattice point diffraction can be automatically and rapidly calculated by the Fast Fourier Transformation (FFT).

DISCLOSURE OF INVENTION

[Problems to be Solved]

Such a diffractive optical element (DOE) consisting of repetition of the unit patterns has drawbacks.

Drawback (1): All that the DOE having equidistantly distributing unit patterns can do is to make divided beams only in regularly-distanced discrete directions leading to lattice points on an image plane. It is possible to shorten the pitch of a lattice by enlarging the size of unit patterns or by shortening a processing light wavelength $\lambda$. The light wavelength is uniquely determined by the kind of laser. Shortening of the wavelength requires replacement of a laser apparatus.

However, we have not many kinds of high-power laser. High-power, available lasers suitable for laser processing are $CO_2$ lasers and YAG lasers at present. The processing light wavelength should be otherwise determined by the material and the kind of processing (boring, annealing, welding). Thus, the wavelength should be intact. The wavelength is not a changeable parameter. Thus, reduction of the pitch of boring holes requires enlargement of unit patterns.

$\Lambda$ denotes a size ($\Lambda$=aP or bQ) of a unit pattern $\Upsilon$. $\lambda$ is a wavelength of a laser. Integer j denotes the order number of diffracted beams. Integer $m_j$ means a diffraction order of the j-th beam. $\alpha_j$ is a diffraction angle of the j-th diffracted beam. Bragg's diffraction formula holds, $$\Lambda \sin \alpha_j = m_j \lambda. \quad (1)$$

The diffraction order $m_j$ is a positive or negative integer (0, $\pm 1, \pm 2, \ldots$). The left side of Eq.(1) is a difference between distances from two corresponding points on two neighboring patterns to an oblique plane slanting at an angle $\alpha_j$. The right side signifies a multiple of the wavelength. Eq.(1) means that the distance difference should be a multiple of the wavelength for diffracting light in the direction of $\alpha_j$.

An $f \sin \theta$ lens enables the unit pattern-having DOE to converge diffracted beams at one- or two-dimensionally equidistantly distributed lattice points on an object plane (image plane) of, for example, a print circuit board. The lattice points on the object plane are distanced from the origin by $\{f \sin \alpha_j\}$ (j=0, $\pm 1, \pm 2, \ldots$). The common pitch p of the equidistant lattice points on the object is given by, $$p = f\lambda/\Lambda. \quad (2)$$

Here, $\Lambda$ is the size of a unit pattern; $\Lambda$=aP or bQ. Microprocessing requires further reduction of the pitch p. Eq.(2) signifies that an increase of the size $\Lambda$ of the unit pattern will reduce the pitch p.

The increment of the unit pattern size $\Lambda$, however, is restricted by some factors. The unit pattern size cannot exceed the size of the DOE. The lengthwise and crosswise repetition of identical unit patterns is indispensable for occurrence of diffraction. The quotient of the DOE size divided by the unit pattern size A should be a large integer. The total size of the DOE is restricted by the size (diameter) of an input laser beam. The laser beam diameter restricts the unit pattern size $\Lambda$ via the DOE size. Thus, the maximum of $\Lambda$ is determined by the input laser beam size. Thus, the pitch p should have a minimum determined by the maximum $\Lambda$. The existence of the large minimum p is an obstacle of further progress of microprocessing by the unit-pattern type DOE.

Drawback (2): The conventional laser processing apparatus utilizing prior unit-patterned DOEs makes diffracted beam spots only on regular lattice points with a definite lattice constant on an object (image) plane but cannot produce diffraction spots on arbitrary non-lattice points on the object plane. Electronic parts sometimes require the laser processing apparatus to make beam spots on sophisticated, non-lattice points on an object. The $f \sin \theta$ lens converges the $\alpha_j$-diffracted beam on the $m_j$-th point on an object, which is one of regularly aligning lattice points, $$f \sin \alpha_j = m_j \lambda f / \Lambda. \quad (3)$$

Here, $m_j$ is an integer, f is a focal length, $\Lambda$ is a unit pattern size, $\lambda$ is a wavelength and thus $m_j \lambda f/\Lambda$ is the j-th lattice point defined on the object.

The conventional unit pattern type diffractive optical element (DOE) is described by referring to FIG. 1. A DOE has G×H unit patterns $\Upsilon$. A unit pattern $\Upsilon$ has P×Q pixels C. A pixel C has a length a and a width b (a×b).

Namely, PQ pixels build a unit pattern $\Upsilon$. GH unit patterns construct a DOE. The DOE includes PQGH pixels. GH unit patterns have all identical distributions of pixels. Thus, degree of freedom of the DOE is only PQ, which is equal to the number of pixels contained in an $\Upsilon$.

When a plane wave light shoots the DOE, repetition of the unit patterns acts as a three-dimensional diffraction grating and makes a plurality of diffraction beams at the diffraction angles obeying Bragg's diffraction formula, i.e., Eq.(1) or El.(3). A horizontal diffraction order is denoted by p (integer) and a vertical diffraction order (y-direction) is denoted by q (integer). The total number of directions of diffraction beams is P in the horizontal (x-) direction and Q in the vertical (y-) direction. The right-hand figure in FIG. 1 is an object (image) plane T having a P×Q lattice structure. The lattice points coincide with crossing points of P×Q diffraction beams on the image plane. Any one $m_j$ of the P×Q lattice points defined on the object (image) plane T is denoted by a set of integers (p, q) as order numbers. The origin is defined at the center point in the object (image). The order numbers p and q satisfy inequalities of $-P/2 \leq p \leq P/2$ and $-Q/2 \leq q \leq Q/2$.

The unit pattern included in the DOE takes another set of parameters (m, n) (m, n: integers) for numbering the PQ pixels. The x-direction (horizontal) order parameter is "m". The y-direction (vertical) order parameter is "n". The origin is determined at the center of a unit pattern. The unit order parameters m and n satisfy inequalities of $-P/2 \leq m \leq P/2$ and $-Q/2 \leq n \leq Q/2$. The complex amplitude transmittance of the (m, n)-th pixel in a unit pattern is designated by $t_{mn}$. In an ideal DOE, the absolute value $|t_{mn}|$ of the complex transmittance $t_{mn}$ is 1. Thus, the transmittance can be written as $t_{mn} = \exp(j\phi_{mn})$, where $\phi_{mn}$ is a phase. The phase $\phi_{mn}$ is important, which is given by a phase difference between a phase change of vacuum passing and a phase change of pixel passing.

The refractive index of the DOE is denoted by "n". The phase difference $\Delta\phi$ is related to the thickness difference $\Delta d_{mn}$ of the m, n-th pixel by $\Delta\phi_{mn} = 2\pi \Delta d_{mn}(n-1)/\lambda = k\Delta d_{mn}(n-1)$.

Thickness steps (differences) $\Delta d_{mn}$ take $g=2^s$ (s; integer) different values. Phase differences $\Delta\phi_{mn}$ and complex amplitude transmittance $t_{mn}=\exp(-j\Delta\phi_{mn})=\exp(-j2\pi\Delta d_{mn}(n-1))$ take $g=2^s$ different values.

Although pixels are classified by black and white in FIG. 1, $2^s$ different steps (16, 32, 64, 128, 256, 512 . . . ) are given to pixels in a practical case. When the DOE is irradiated with a laser beam, the DOE produces several diffraction beams in different directions. The diffracted beams converge at selected lattice points (p, q) on the object (image) plane T. Lattice points are defined as crossing points of horizontal lines and vertical lines. In any case, no beam is diffracted to none-lattice point regions, which are defined as extra regions other than the lattice points. Lattice points have possibility of being chosen to be irradiated. All the (PQ) lattice points, however, are not always irradiated. Some of the PQ lattice points are chosen to be irradiated but other lattice points are left unirradiated. The choice depends upon the unit pattern.

The wording "lattice points" will be used also hereafter in this specification. Lattice points mean lengthwise and crosswise equidistant aligning points on an image (object) plane. Lattice points also denote equiangular points in diffraction angle space before shooting the image plane (T). The beams which pass the lattice points in the diffraction angle space will shoot the corresponding lattice points on the object plane (T). Directions or positions of the lattice points are exactly given by Eq. 2 or Eq. 3.

Amplitude $W_{pq}$ of the beam diffracted in the (p, q) direction by the DOE should be clarified. A lattice point (p, q) on an object corresponds to the diffraction angle order (p, q) one by one. Fourier transformation of the complex transmittance $t_{mn}$ of the DOE gives the (p, q) direction diffraction amplitude $W_{pq}$. A square $|W_{pq}|^2$ of the complex amplitude $W_{pq}$ is diffraction power at the (p, q) point on the object (T).

$$W_{pq} = \mathrm{sinc}\left(\frac{p}{P}\right)\mathrm{sinc}\left(\frac{q}{Q}\right)\sum_m\sum_n t_{mn}\exp\left\{-2\pi j\left(\frac{mp}{P}+\frac{nq}{Q}\right)\right\} \quad (4)$$

Eq.(4) for $W_{pq}$ is a simple equation suitable for calculation. Eq.(4) will be explained later. The summations $\Sigma\Sigma$ of m and n should be carried not in the whole DOE but in only a single unit pattern $\Upsilon$. The calculation is not a sum of PQGH pixels but a sum of PQ pixels. Integers p and q mean lattice points. Although it may not clear from Eq.(4), the summations of $W_{pq}$ of Eq.(4) for non-integers p and q are always zero. Integers p and q can yield non-zero $W_{pq}$. Namely, diffraction occurs only in the directions (p, q) for integers p and q. Diffraction makes beam spots only on the lattice points on an image plane. No diffraction beams make spots on non-lattice points. Then, $W_{pq}$ should be calculated only for integers p and q or only on lattice points (integer (p, q)).

Calculation of $W_{pq}$ for non-integers p and q is unnecessary, because it is known that $W_{pq}=0$ for non-integers p, q. This does not mean that an actual calculation of $W_{pq}$ for non-integers p and q is always zero but the repetition of unit-patterns assures $W_{pq}=0$ for non-integers p and q. Then, a p, q non-integer $W_{pq}$ should be left out of consideration.

The above sin c function is defined as $\sin c(x)=\sin(\pi x)/\pi x$ which takes a maximum 1 at x=0 and oscillatingly decreases as x increases or decreases from 0. The inclusion of the sin c function signifies reduction of higher order diffraction beams due to regular repetition of unit patterns in a DOE.

When values of a set of $\{t_{mn}\}$ are given, the Fast Fourier Transformation (FFT) can calculate double summation $\Sigma\Sigma$ in a short time without difficulty. Since the parameters p and q included in exp( ) are integers, the FFT can calculate $W_{pq}$ (Eq.(4)). The parameters p and q are diffraction order parameters which correspond to $m_j$ in the Bragg diffraction formula Eq.(1). Thus, p and q are integers. The FFT can be only applied to the functions which have discrete parameters with a definite sampling interval. The Fourier transformed function by the FFT is also has discrete parameters with another definite sampling interval. Eq.(4) has the discrete transmittance matrix $\{t_{mn}\}$. $W_{pq}$ has discrete parameters p and q. Discreteness of $t_{mn}$, p and q enables the FFT to calculate $W_{pq}$ at a high speed.

The number of the parameters (m, n) on the DOE is PQ. The number of the parameters (p, q) on the image plane is PQ. The number of the DOE parameters is equal to the number of the image parameters. Beam power intensity I(p, q) in a (p, q) direction is given by squaring the absolute value of the complex diffraction amplitude $W_{pq}$.

$$I(p, q)=|W_{pq}|^2 \quad (5)$$

The design of a DOE is equivalent to the determination of $W_{pq}$. $W_{pq}$ should be determined by presuming a desired diffraction beam pattern on an image plane, assuming $t_{mn}$ for pixels on a DOE for producing the desired diffraction pattern, calculating $W_{pq}$ from the assumed $t_{mn}$ by the Fast Fourier Transformation, squaring $W_{pq}$ into I(p, q), comparing I(p, q) with the desired diffraction pattern, and examining the similarity. A plurality of candidates $\{t_{mn}\}$s are obtained in general. An optimum $\{t_{mn}\}$ can be chosen by estimating the candidates $\{t_{mn}\}$s by a merit function.

$U_1$ and $V_1$ are defined as two-dimensional angular resolutions of the conventional DOEs having repetition of unit patterns. Resolution means a minimum of discernible spacing. Angular resolution signifies a minimum discernible angle. The angle between lines directed from the DOE to neighboring image lattice points is the necessary angular resolution for the conventional DOEs. The angular resolution for the conventional DOEs is e/L, where L is the distance from the DOE to the image plane and e is a lattice constant (=unit length of a lattice). Bragg's diffraction condition is denoted by $\sin\alpha=m\lambda/\Lambda$ (m: integer, $\alpha$: diffraction angle). One step of a variation of $\sin\alpha$ is $\Delta(\sin\alpha)=\lambda/\Lambda$. One step difference should be equal to the angular resolution. Then, $e/L=\lambda/\Lambda$. The necessary angular resolutions $U_1$ and $V_1$ are a quotient of a wavelength divided by the unit pattern size $\Lambda(=aP$ or $bQ)$.

$$U_1=\lambda/aP. \quad (6)$$

$$V_1=\lambda/bQ. \quad (7)$$

A DOE is an assembly of G×H unit patterns. A unit pattern is an assembly of P×Q pixels (a×b). The width of the DOE is aGP=aR. The length of the DOE is bHQ=bS. The angular resolutions of the conventional DOEs cannot decrease less than a quotient ($\lambda$/aR or $\lambda$/bS) of the wavelength divided by the DOE size. The angular resolutions (minimum discernible angles) are too large in prior DOEs.

$$U_1>\lambda/aR. \quad (8)$$

$$V_1>\lambda/bS. \quad (9)$$

The rough resolutions mean that the conventional DOEs can make diffraction beams only upon lattice points and cannot diffract beams on non-lattice points. Object patterns must consist of lattice point spots. The confined scope of the object patterns degrades the utility of DOEs.

Derivation of Eq.(4) is briefly described. Wave optics requires to calculate image amplitude $W_{pq}$ on an image plane (X, Y) by summing up individual amplitudes $t_{mn}$ multiplied by oscillating parts given by exp( ). The oscillating term exp( ) includes a part such as $$k(xX+yY)/L. \qquad (10)$$

L is a distance between the DOE and the image plane. Small letters x and y are coordinates on the DOE. Capital letters X and Y are coordinates on the image. A size of a pixel, which has one definite parameter $t_{mn}$, is a×b. The coordinates x and y on the DOE can be converted into discrete representation;

$$x=ma, y=nb. \qquad (11)$$

Similarly, an image plane has a lattice structure with a lattice constant e. The coordinates X and Y on the image can be converted into discrete representation;

$$X=pe, Y=qe. \qquad (12)$$

Substitution of Eqs.(11) and (12) into Eq.(10) produces $$k(mape+nbqe)/L. \qquad (13)$$

An aperture angle looking from the DOE to the lattice length on the image is e/L, since e is the lattice constant and L is the distance from the DOE to the image plane. Δ is employed as a symbol of discrete differentiation. Bragg's diffraction condition is expressed by e/L=Δ(sin α)=Δ(mₖλ/Λ)=λ/Λ.

The wave number k is given by $k=2\pi/\lambda$. The unit patter size is Λ=Pa or Qb. Eq.(13) can be converted into, $$(2\pi/\lambda)(map+nbq))\lambda/\Lambda = 2\pi(mp/P+nq/Q). \qquad (14)$$

The right-hand side of Eq.(14) is the same as the value included in the bracket of the exp( . . . ) of Eq.(4). The above is a simple proof why Eq.(4) can give the transformation from the DOE parameters $\{t_{mn}\}$ to the image pattern $\{W_{pq}\}$. Since m and p are integers from −P/2 to +P/2 and n and p are integers from −Q/2 to +Q/2, Eq.(4) having such an exp( . . . ) can be swiftly calculated by the Fast Fourier Transformation (FFT).

[Means for Solving the Problems]

The present invention calculates the intensity W(α, β) of beams diffracted on non-lattice points (α, β) by assigning arbitrary complex transmittance $\{t_{mn}\}$ to all pixels (m, n) in a non-unit pattern DOE and summing up the following equation (15) discretely with m and n.

$$W(\alpha, \beta) = \operatorname{sinc}\left(\frac{a\alpha}{\lambda}\right)\operatorname{sinc}\left(\frac{b\beta}{\lambda}\right)\sum_m \sum_n t_{mn}\exp\{-jk(ma\alpha + nb\beta)\} \qquad (15)$$

The FFT has been partially abandoned by the present invention. Eq.(15) seems to resemble the FFT-suitable Eq.(4) in the form. However, Eq.(15) is entirely different from the FFT-available Eq.(4). Summation by m and n is not restricted within a unit pattern but done for all the pixels. Quantity of calculation increases up to GH times as much as the in-unit-pattern summation of the conventional FFT.

In addition, diffraction point parameters are not integers p and q but non-integer fractional points which are denoted by continual angles α and β. (α, β) is not a lattice point on an image but a non-lattice point. α and β are not integers which prevent us from relying upon the FFT and force us to calculate the Fourier Transformation Eq.(15) by actually summing up with m and n step by step for all the pixels.

Besides the increment of the calculation quantity, the present invention increases the degree of freedom of designing DOEs. The increase of design freedom enables the present invention to assign diffracted beams upon non-lattice points on an image and enhance angular resolutions. But, the number of the diffracted beams (α, β) is still K which is equal to the number of the diffracted beams in the conventional FFT-operative DOE. The number of the object points does not increase. Inapplicability of the FFT and increment of terms included in Eq.(15) up to HG times force the present invention to consume long time for calculation of Eq.(15) and assigning initial conditions and transmittance matrix $\{t_{mn}\}$.

It takes long time to calculate Eq.(15). Then, the present invention uses Eq.(15) for the calculation of the intensity $W(\alpha_k, \beta_k)$ diffracted beams $(\alpha_k, \beta_k)$ but uses the FFT for the calculation of noise. Noise, which should be zero in an ideal limit, is far smaller than $W(\alpha_k, \beta_k)$ The use of the FFT would bring about no serious error for the noise calculation. The present invention thus uses both the exact, direct summation calculation (Eq.(15)) and the convenient FFT calculation (Eq.(4)). This invention has a hybrid character.

FIG. 2 shows the relation between a DOE and an image of the present invention. The diffractive optical element (DOE) is not a set of repeated common unit patterns but a set of RS free pixels aligning in R lines and S columns, which can take free parameters. A conventional DOE has a three-storied structure of pixel/unit pattern/DOE. The present invention, which lacks the middle unit pattern, has a two-storied structure of pixel/DOE.

A pixel can take any one of g steps of height (thickness), where $g=2, 4, 8, 16, 32, \ldots, 2^s$ (s=1, 2, 3, . . . ). As explained before, $t_{mn}=\exp(-j2\pi(n-1)\Delta d_{mn}/\lambda)$, where the height difference is $\Delta d_{mn}=\{0, 1, 2, 3, \ldots, (g-1)\}\times\{\lambda/(n-1)g\}$.

The DOE diffracts a laser beam into k beams in k directions. The intensity of the beam diffracted in an α, β-direction is denoted by W(α, β). W(α, β) should be obtained as a Fourier transformation of the DOE complex transmittance $\{t_{mn}\}$ Since the DOE includes no unit pattern, there is no concept of ±n-th order diffraction any more. Angular dependence of the beams diffracted by the DOE can be obtained by carrying out actual calculation of the Fourier transformation of $\{t_{mn}\}$.

$$W(\alpha, \beta) = \operatorname{sinc}\left(\frac{a\alpha}{\lambda}\right)\operatorname{sinc}\left(\frac{b\beta}{\lambda}\right)\sum_m \sum_n t_{mn}\exp\{-jk(ma\alpha + nb\beta)\} \qquad (16)$$

Here, k is the wave number $2\pi/\lambda$. What differs from Eq.(4) is that orientation-designating parameters α and β are not always integers (p and q) but fractional real numbers in general and that the scopes of summations of m and n are not a unit pattern but the whole DOE.

The change is not only a simple replacement from integer parameters p and q to real number parameters a and P. The change also means allowance of non-lattice angles which do not correspond to lattice points. Summations are not restricted within a small unit pattern (P×Q) but include all the pixels (R×S=P×Q×G×H) in the whole DOE.

Intensity distribution I(α, β) is obtained by squaring the complex amplitude W(α, β).

$$I(\alpha, \beta) = |W(\alpha, \beta)|^2. \qquad (17)$$

"K" denotes the number of the diffracted, diverging beams. K is a definite integer which has been predetermined by the purpose of the DOE. K beams are designated by k=1, 2, 3, . . . , K. Two-dimensional angles for the k-th diffracted beam are denoted by $\alpha_k$ and $\beta_k$.

Unlike the design of the conventional DOEs, it is not necessary to determine the diverging beam angles α and β as multiples of predetermined angular resolutions $U_1$ and $V_1(\lambda/\Lambda)$ in the design of DOEs of the present invention. However, it is still possible for the present invention to define necessary angular resolutions $U_2$ and $V_2$ other than $\lambda/\Lambda$. Sines of the diffraction angles ($\alpha$, $\beta$) of the diffracted beams can be determined as multiples of small common positive values $U_2$ and $V_2$ which should be properly chosen. Namely, sines of the angles can satisfy the following equations for some integers $m_k$ and $n_k$, $$\sin \alpha_k = m_k U_2, \quad (18)$$

$$\sin \beta_k = n_k V_2. \quad (19)$$

Here, k integers $\{m_k\}$ should have no common divisor and k integers $\{n_k\}$ have no common divisor. Namely, $\{m_k\}$ are prime to each other and $\{n_k\}$ are prime to each other. The greatest common divisor (measure) for groups $\{\sin \alpha_k\}$ of sines of diffraction angles $\{\alpha_k\}$ is defined as $U_2$. The greatest common divisor (measure) for $\{\sin \beta_k\}$ should be defined as $V_2$ in the present invention. The multiples $m_k$ and $n_k$ are integers. Thus, $U_2$ and $V_2$ can be called angular resolutions for the DOEs of the present invention.

Diffraction angles of the sine groups $\{\sin \alpha_k\}$ and $\{\sin \beta_k\}$ are not integers. The greatest common measures (GCMs) of $\{\sin \alpha_k\}$ or $\{\sin \beta_k\}$ may sound strange. But, since $\{\sin \alpha_k\}$ and $\{\sin \beta_k\}$ are real number, the greatest common measure can be defined for the group numbers of $\{\sin \alpha_k\}$ or $\{\sin \beta_k\}$.

Here, a "common measure (divisor)" is defined as a non-integer number which can divide all $\{\sin \alpha_k\}$ with integer quotients. The greatest common measure is the greatest one among the common measures. The angle corresponding to the greatest common measure is equal to the necessary angular resolution.

Unless the angles $U_2$ and $V_2$ were small enough, inequalities of $|\sin \alpha_k - \sin \alpha_{k'}| < U_2$ and $|\sin \beta_k - \sin \beta_{k'}| < V_2$ would hold. The required angular resolutions are given by Eqs.(18) and (19).

Since a DOE consists of R×S pixels whose size is a×b, the size of the DOE is aR×bS. All the pixels (m, n) have the freedom of taking arbitrary transmittance $\{t_{mn}\}$ The freedom of choice of $\{t_{mn}\}$ enables the angular resolutions $U_2$ and $V_2$ to satisfy inequalities $U_2 < \lambda/aR$ and $V_2 < \lambda/bS$.

Here, the newly-defined angular resolutions $U_2$ and $V_2$ are entirely different from the concept of the prior angular resolutions $U_1 = \lambda/aP$ and $V_1 = \lambda/bQ$ defined in the conventional design. The newly-introduced $U_2$ and $V_2$ are far smaller than the conventional $U_1$ and $V_1$.

One of the features of the present invention is that the DOE has no unit pattern Y and all pixels are free parameters. All pixels can take an arbitrary, free value for the degree of heights. Since all the pixels are free parameters, the divergent beams can take free, arbitrary directions without the restriction of the Bragg condition. It is convenient to design the beam directions in free, arbitrary directions. However, the freedom of pixels deprives DOEs of the regularity of unit patterns and the concept of diffraction orders.

The present invention, which lacks the concept of diffraction orders, should be still able to discern the minimum of differences of diffraction angles of diverging beams. The minimum angular resolutions are defined to be $U_2 = \lambda/aR$ and $V_2 = \lambda/bS$.

The newly-defined angular resolutions $U_2$ and $V_2$ are still smaller than the conventional angular resolutions $U_1$ and $V_1(=\lambda/\Lambda)$ which are determined by the size of the unit pattern $Y$. Increases of the number of parameters and the quantity of calculations can heighten the resolutions in the present invention.

The present invention can be defined in different ways on different terms. This invention can be first defined as a beam diffraction apparatus which is founded upon high degrees of freedom in which all the RS(=PQGH) pixels can take free values of transmittance $t_{mn}$ (m and n are line and column numbers of a pixel). The same matter can be expressed by inequalities of $U_2 < \lambda/aR$ and $V_2 < \lambda/bS$. The second definition based upon the inequalities may not be easily understood for the feature of the present invention. However, the second definition gives a criterion which is suitable for mathematical examination.

The same matter can be otherwise represented by the request for extra calculations of diffraction intensity on non-lattice points other than the lattice points (p, q). However, the third definition of the present invention should be preceded by the definitions of diffraction images and lattice points of diffraction images.

Otherwise, the present invention can be negatively defined as an apparatus based upon a DOE which excludes repetition of similar unit patterns.

The present invention lacks unit patterns and prevents the Fast Fourier Transformation (FFT) on a unit pattern from calculating an entire image pattern. Instead of the patterned FFT, the present invention must calculate the complex amplitude $W(\alpha, \beta)$ at arbitrary, non-lattice, diverging angles $\alpha$ and $\beta$ by summing up all Fourier transformation contributions from all the individual pixels. The full calculation of Fourier transformation takes long time in double meanings. The existence of the unit patterns restricts the angular resolution to $\lambda/\Lambda$. The present invention enjoys far smaller angular resolutions than $\lambda/\Lambda$.

The conventional unit patterned DOE makes diffraction spots of unit patterns only at lengthwise, crosswise, regularly aligned lattice points. No diffraction spots are produced on extra non-lattice regions.

The present invention can obtain an arbitrary diffraction image having non-lattice diffraction points, since the present invention designs and makes a non-unit-pattern DOE. The number K of diffracted beams is definite and discrete. But the diffraction spots on an image plane are not always on lattice points.

The image spots and the number of diffracted beams and the angular resolutions $U_2$ and $V_2$ are contingent upon an actual pixel transmittance matrix $\{t_{mn}\}$. The above multiple definitions of the present invention are not insignificant despite the contingency on $\{t_{mn}\}$.

It takes much time to calculate Fourier transformation for all pixels in the teaching of the present invention. An adequate selection of $\{t_{mn}\}$ enables this invention to bring diffraction beams at non-lattice points and obtain small resolutions $U_2$ and $V_2$ satisfying inequalities $U_2 < \lambda/aR$ and $V_2 < \lambda/bS$.

The conventional unit-patterned DOE cannot bring diffraction beams at non-lattice points and cannot reduce angular resolutions $U_1$ and $V_1$ less than $\lambda/aR$ and $V_2 < \lambda/bS$ for any selection of $\{t_{mn}\}$.

It is not easy to understand the above differences between the conventional unit-patterned DOE and the present invention DOE.

Exclusion of unit patterns and overall free choice of pixels allow the present invention to produce diverging beams aligning in arbitrary spot numbers and distributions.

[EFFECTS OF THE INVENTION]

The present invention can irradiate a plurality of arbitrary points simultaneously with laser beams with high accuracy. This invention succeeds in free, precise laser simultaneous multipoint processing which is required for electronics products. Another advantages of the present invention are acceleration and cost-reduction of the laser processing.

The conventional DOE, which has repetition of common unit patterns, makes a plurality of beams diffracted into predetermined, discrete lattice points aligning two-dimensionally at constant intervals (lattice constants). The function of the DOE is essentially Fourier transformation for making divided multibeams shooting upon the known lattice points regularly aligning on an object. Thus, it was enough for the conventional DOE to calculate the diffraction beam intensity only on the predetermined object lattice points.

The conventional DOE enables the Fast Fourier Transformation (FFT) to calculate diffraction beams in a short time. However, the unit-patterned conventional DOE makes diffraction beams just on the predetermined lattice points at intervals (lattice constants) which are equal to $\lambda/\Lambda$, where $\lambda$ is a wavelength of a laser and $\Lambda$ is the size of a unit pattern. The lattice constant is pretty large, which is one drawback. A wide lattice constant is inconvenient to depict fine diffracted patterns. Reduction of the lattice constant requires enlargement of the unit pattern. But, the enlargement is not always possible, since the unit pattern size should be a divisor of a DOE size. Another drawback is that it is impossible to produce non-lattice, free patterns including non-lattice points which deviate from lattice points.

Instead of building up repetition of common unit patterns, this invention gives all pixels full freedom of thickness (or height). Thus, the present invention increases the degree of freedom up to GH times as much as the conventional DOE, where GH is the number of unit patterns included in the DOE. The points shot by diffraction beams are not always lattice points.

The concept of lattice points vanishes in the present invention, which dispenses with unit patterns. The spot distribution changes from discrete, digital distribution to analog distribution.

The number of points on which the diffraction intensities should be calculated increases to a great extent. The Fast Fourier Transformation is inapplicable. The diffraction intensity at necessary points should be calculated by the whole Fourier transformation. These are weak points of the present invention.

Despite the drawbacks, the present invention has strong points of producing arbitrary patterns consisting of non-regular, non-lattice point distribution on an object, enhancing precision by fining resolutions, widening the scope of applicability of DOEs, and heightening utility of DOEs.

This invention enables the diffractive optical element to irradiate a plurality of arbitrary points simultaneously with high accuracy with divided laser beams. This invention satisfies a requirement of high-precision laser light processing at arbitrary points, which is suitable for making electronic devices. This invention is effective for acceleration and cost-alleviation of laser processing.

BEST MODE FOR CARRYING OUT THE INVENTION

The above calculation for arbitrary angle diffracted beams enables the present invention to optimize the design of DOE patterns. There are several optimizing methods. Here, a Direct Binary Search (DBS) method is adopted as an optimizing method like our prior designing of Japanese Patent Publication No.2000-231012 of the same inventor.

The DBS method employs a merit function for estimating the characters of DOEs. The DOE patterns are optimized by giving trial $\{t_{mn}\}$ to pixels, calculating $W(\alpha, \beta)$ for the $\{t_{mn}\}$ by Eq.(16), estimating the result by the merit function, changing $\{t_{mn}\}$ for the direction of lowering the merit function, and minimizing the value of the merit function. The set of $\{t_{mn}\}$ which minimizes the merit function is one of the candidate transmittance matrixes $\{t_{mn}\}$.

When a set of $\{t_{mn}\}$ is given, $W(\alpha, \beta)$ can be calculated by Eq.(16). Beam intensity functions $I(\alpha, \beta)$ is given by $I(\alpha, \beta)=|W(\alpha, \beta)|^2$. For example, the following merit function E allows us to estimate the solutions, $$E = W_1\left(\eta_0 - \sum_k I(\alpha_k, \beta_k)\right)^2 + W_2\sum_k (I(\alpha_k, \beta_k) - \bar{I})^2. \quad (20)$$

In the expression, $\eta_0$ is an object intensity value of the diffraction beams, $\bar{I}$ is an average of $I(\alpha, \beta)$, and $W_1$ and $W_2$ are weight constants. An adequate set of $\{t_{mn}\}$ is sought by minimizing the merit function E. In minimizing E, the first term of the right hand of Eq.(20) has a tendency of raising diffraction efficiency and the second term has an effect of enhancing uniformity of diffracted beams. Minimizing enables the merit function to design a suitable DOE which diffracts a beam into desired directions with high diffraction efficiency and uniformity.

The merit function of Eq.(20) neglects noise and reduction of diffracted beams by noise. The use of Eq.(20) would allow strong noise to occur in undesired directions. Besides the main, processing beams, noise should be taken into account. However, calculation of noise is more difficult than the calculation of diffraction beams. Of course, noise can be calculated by $W(\alpha, \beta)$ of Eq.(16). But, noise happens in unexpected directions. Unlike the programmed diffraction beams, the directions $(\alpha, \beta)$ of noise occurrence cannot be prophesied. To investigate noise occurrence in all directions, all $W(\alpha, \beta)$ should be calculated except diffraction directions $(\alpha_k, \beta_k)$ It is nearly impossible to calculate all the $W(\alpha, \beta)$ for continual $(\alpha, \beta)$ except diffraction $(\alpha_k, \beta_k)$.

On the contrary, the conventional calculation based upon the FFT can calculate P×Q spectra including noise by a single cycle of calculation.

Then, this invention calculates noise distribution by the Fast Fourier Transformation (FFT) which can obtain only $W_{pq}$ at lattice points (p, q) (p, q=integers). The FFT cannot calculate noise at non-lattice points. But, it matters little. Noise occurrence is continual. Non-lattice point noise can be approximated by the nearest neighboring lattice point noise. The present invention has a hybrid character. Diffraction beams are calculated by the entire Fourier transformation calculation in the whole DOE, but noise calculation is carried out only at lattice points by the FFT as expressed by Eq.(4). A discrete angular spectrum which is obtained by the Fast Fourier Transformation (FFT) for the R×S pixels (all pixels in DOE) is denoted by $I_{rs}$. $I_{rs}$ still has diffraction beam intensity as well as noise. $I_{rs}$ takes large values near the k-th diffracting beams $(\alpha_k, \beta_k)$. Then, $I'_{rs}$ is defined as a value by subtracting diffraction beam intensity from the whole spectrum $I_{rs}$. Then, $I'_{rs}$ includes only noise spectrum. For example, instead of the merit function Eq.(20), noise can be taken into consideration by using, the following new merit function, $$E = \quad (21)$$
$$W_1\left(\eta_0 - \sum_k I(\alpha_k, \beta_k)\right)^2 + W_2\sum_k (I(\alpha_k, \beta_k) - \bar{I})^2 + W_3\max_{r,s}(I'_{rs})^2$$

The third term of the right side reveals a function of reducing noise ($W_3$ is a weight constant). Noise calculation is prosecuted by the FFT. Thus, the noise angular resolutions are restricted by $U_3=\lambda/aR$ and $V_3=\lambda/bS$.

Since the present invention essentially designs a DOE without using the FFT, there is a possibility that the noise may be included at narrow, localized regions below the large resolutions $U_3$ and $V_3$. The above FFT cannot detect such localized, hidden noise. The inventor further contrives two noise detection methods.

[Noise Detection Method (1)]

The calculation region is enlarged to R'×S' pixels (R'>R, S'>S) by adding virtual, vacant pixels of $t_{mn}=0$ to neighboring regions around the R×S pixels. Enlargement of the calculation range reduces resolutions down to $U_3'=\lambda/aR'$ and $V_3'=\lambda/bS'$. Of course, $U_3'<U_3$ and $V_3'<V_3$. Since angular resolutions are refined for noise, noise detection becomes facile.

[Noise Detection Method (2)]

Eq.(16) does not include the information of incident beam intensity distribution. The present invention is also applicable to another design taking account of the incident beam intensity distribution.

$$W(\alpha, \beta) = \text{sinc}\left(\frac{a\alpha}{\lambda}\right)\text{sinc}\left(\frac{b\beta}{\lambda}\right)\sum_m \sum_n a_{mn} t_{mn} \exp\{-jk(ma\alpha + nb\beta)\} \quad (22)$$

Here, $a_{mn}$ is complex amplitude of the incident beam. The beam is divided into discrete small rectangle cells which have the same size as the pixel of the DOE. Then, the divided beam cells are numbered by m and n which are the same as the pixels. The (m, n) cell of the incident beam aligns along the same axial line which pierces the (m, n) pixel of the DOE.

For example, if the incident beam is a Gaussian beam with a $1/e^2$ diameter of aR/2, an angular diameter of the Gaussian beam in an angular spectrum is $8\lambda/\pi aR = 8U_3/\pi$, which is over twice the afore-mentioned angular resolution $U_3$. A noise spot has a similar diameter to the beam spot. This makes it easy to detect noise by the FFT irrespective of the restriction on the angular resolution.

Eq. (16) aims at calculating an angular spectrum on an image, that is, a far-field pattern (Fraunhofer diffraction image). The DOE designed by the teaching expressed by Eq.(16) is a Fourier type (=Fraunhofer type) DOE having an indefinite far-distanced focus ($f=\infty$).

A Fresnel type DOE having a definite focal distance f can be obtained by superposing the Fourier type DOE upon a pattern made by a converging lens with a definite focus f. Before the superposition, the pixel size of the Fourier type DOE should be equalized to the pixel size of the lens pattern.

A pattern of a shorter focal length lens requires smaller pixel size. If the focus of the lens is too short, it is preferable to divide a pixel of the Fourier type DOE from a×b into a'×b', where $a'=a/C_1$, $b'=b/C_2$, ($C_1$, $C_2$; integers). The converging lens should be designed on the reduced sizes a' and b'. Then, a Fresnel type DOE is made by superposing the Fourier DOE of a unit size of a'×b' on the lens of a unit size of a'×b'.

A Fresnel type DOE can reduce the influence deriving from microprocessing errors (e.g., step errors), in particular, reduce the fluctuation of the 0-th order beam ($\alpha=\beta=0$), which had been described in our Japanese Patent No.3,346,374.

A Fresnel type DOE can be designed by multiplying a lens pattern to the Fourier type DOE of the present invention. Thus, the Fresnel type DOE's $W(\alpha, \beta)$ can be obtained by summation of an equation similar to Eq.(16) with m and n with regard to all pixels.

EMBODIMENT 1

[Embodiment 1 (Fraunhofer Type (=Fourier Type) DOE, Small Diverging Angles)]

[A. Properties of the Fraunhofer DOE]

Wavelength: 10.6 μm

Mode: $TEM_{oo}$

Beam diameter($1/e^2$): 10 mm

Step number of heights: 16

Pixel size: a=20 μm, b=20 μm

Pixel number in a DOE: R=1000 pixels, Q=1000 pixels

DOE size: aR=20 mm, bS=20 mm

Number of divided beams: 49 (=7×7)

Diffracted beam pattern: FIG. 3, $P_1$=3.93701 mrad, P2=3.93701 mrad, $\delta_1$=0.15748 mrad, $\delta_2$=0.07874 mrad (rad=57.29 degrees, mrad=$10^{-3}$ rad)

Angular resolutions U and V are sought by the equations $\sin \alpha_k = m_k U$ and $\sin \beta_k = n_k V$. In Embodiment 1, $U=\delta_1$=0.15748 mrad and $V=\delta_2$=0.07874 mrad. $\lambda/aS=\lambda/bS$=0.53 mrad. Embodiment 1 satisfies the prescribed conditions $U<\lambda/aR$ and $V<\lambda/bS$.

[B. Result of Designing of DOE]

DOE of Embodiment 1

Diffraction rate: 82.2%

Intensity fluctuation: 1.6%

Largest noise intensity: 3.6%

FIG. 4 is an incident beam intensity pattern. FIG. 5 is a DOE step distribution pattern. FIG. 6 is an image spot distribution pattern.

[C. Laser Processing Apparatus]

A laser processing apparatus is manufactured by combining a $CO_2$ laser, the above-mentioned Fourier type DOE and a flat/convex lens (f=127 mm, 50.8 mm diameter, ZnSe). The spot diameter on an image plane is 171 μmφ.

An object arrangement of spots in angular space of Embodiment 1 is shown in FIG. 3. The abscissa is a horizontal angle α. The ordinate is a vertical angle β. It should be noted that this pattern is not an image pattern projected onto the image plane. 7×7 spots align in α- and β-directions. The beam spots are not all upon lattice points but slightly deviate from the lattice points.

Four (±2, ±2) points, four (0, ±2), (±2, 0) points and one (0, 0) point are on the lattice points. Other points deviate from the lattice points. Vertical and horizontal series of the spots depict wavy lines instead of straight lines. The off-lattice pattern is the object of Embodiment 1. The conventional unit-patterned DOE cannot produce such an off-lattice pattern.

Lattice constants are $P_1$=500 μm and $P_2$=500 μm. A lattice has a size of 500 μm×500 μm. In FIG. 3, four (±3, ±3) points deviate by $\delta_1$ and $\delta_2$ in a counterclockwise direction from lattice points. The (+3, +3) point is off from the nearest lattice point by $-\delta_1$=−20 μm and $\delta_2$=10 μm. Deviations are exaggerated in FIG. 3 for emphasizing that the invention DOE can make off-lattice diffraction beams. Another (−3, −3), (−3, +3), (+3, −3) points deviate by $\pm\delta_1$(=20 μm) and $\pm\delta_2$(=10 μm). Since given deviations are $\delta_1$ and $\delta_2$, resolution angles $U_3$ and $V_3$ should be smaller than $\delta_1$ and $\delta_2$.

Such off-lattice diffracted beams cannot be produced by the conventional DOE with repetition of common unit patterns. What produces the off-lattice pattern is only the DOE which the present invention proposes.

FIG. 4 is a spatial power distribution of the incident laser beam. The incident beam is a $CO_2$ laser beam of a Gaussian power distribution.

FIG. 5 shows the pattern of the DOE designed by the teaching of the present invention. The DOE seems to be repetition of similar amorphous blank islands. But, the blank islands are different in shape and size. The DOE is not repetition of identical unit patterns.

FIG. 6 is a 7×7 diffraction beam spot angular distribution on an image produced by the DOE of Embodiment 1. The size of the image including margins is 39.75 mrad. A neighboring spot interval is nearly 5 mrad. Points are not on lattice points but deviate from virtual lattice points. Every set of vertical seven points is not on a direct line but on a wavy line. All third line points and all seventh line points deviate to the right. All first line points and fifth line points deviated to the left. The 7×7 object pattern includes diffraction points deviating from virtual lattice points. Embodiment 1 allows the beam spots to deviate arbitrarily from the lattice points. The beam intensity is uniform.

EMBODIMENT 2

[Embodiment 2 (Fraunhofer Type (=Fourier Type) DOE, Large Diverging Angles)]

[A. Properties of the Fraunhofer DOE]
Wavelength: 10.6 μm
Mode: $TEM_{oo}$
Beam diameter($1/e^2$): 10 mm
Step number of heights: 16
Pixel size: a=20 μm, b=20 μm
Pixel number: R=1000 pixels, S=1000 pixels
DOE size: aR=20 mm, bS=20 mm
Number of divided beams: 49 (=7×7)
Diffracted beam pattern: FIG. 3, $P_1$=39.37008 mrad, $P_2$=39.37008 mrad,
$\delta_1$=0.15748 mrad, $\delta_2$=0.07874 mrad The object diffracted beam pattern is similar to the pattern shown in FIG. 3 having fluctuating (7×7) spots deviating from lattice points for clarifying difference between Embodiments 1 and 2. The patterns are similar figures but the sizes are different between Embodiments 1 and 2. Embodiment 2 chooses lattice constants $P_1$=39.37008 mrad and $P_2$=39.37008 mrad for investigating a case of large diverging angles. Embodiment 2 has the lattice constants which are ten times as large as Embodiment 1. Deviation of spots from the lattice points, however, are the same as Embodiment 1. Namely, Embodiment 2 takes $\delta_1$=0.15748 mrad and $\delta_2$=0.07874 mrad which are the same as Embodiment 2. Ratios of deviation/lattice are reduced.

In Embodiment 2, necessary resolutions U and V in x- and y-directions are $U=\delta_1$=0.15748 mrad.

$V=\delta_2$=0.07874 mrad.

In Embodiment 2, aR=20 mm (20000 μm) and bS=20 mm (20000 μm). Ratios of wavelength/DOE are $\lambda/aR=\lambda/bS$=0.53 mrad. These values of parameters satisfy inequalities, $U(0.15748 \text{ mrad}) < \lambda/aR(0.53 \text{ mrad})$, $V(0.07874 \text{ mrad}) < \lambda/bS(0.53 \text{ mrad})$.

Embodiment 2 also satisfies the prescribed conditions.

[B. Result of Designing of DOE]

DOE of Embodiment 2
Diffraction rate: 71.6%
Intensity fluctuation: 1.7%
Largest noise intensity: 3.5%

The pattern of the DOE is depicted by FIG. 7. Thickness (height) distribution (16 steps) of the DOE is represented by a black-white monochromatic tone. FIG. 7 shows a lattice-like pattern with narrow lattice constants. A fine structure of tones within lattices are obscure. The DOE (FIG. 7) of Embodiment 2 is entirely different from the former DOE (FIG. 5) of Embodiment 1. Since the branching beam angles are large, repetition of the DOE pattern is fine in Embodiment 2.

No unit pattern should exist in the DOE in FIG. 7. There should be no repetition of unit patterns having the same shape and the same size. But, the DOE seems to have quasi-regular repetition of spots in two dimensions like cloth. It may be marvelous. But, the deviations $\delta_1$ and $\delta_2$ are quite small in comparison to the pitches $P_1$ and $P_2$ in Embodiment 1. Then, the DOE becomes similar to the conventional regular DOEs consisting of repetition of unit patterns.

The solution of designing the DOE which produces spot disposition of FIG. 3 is not unique. Patterns of the DOE for realizing an object spot distribution have many solutions due to many degrees of freedom of the DOE. A pertinent solution has been chosen by a merit function. The merit function selects a suitable pattern for reasons of a high diffraction ratio, satisfaction of object values or low fluctuation of power of branched beams.

[C. Laser Processing Apparatus]

A laser processing apparatus is manufactured by combining a $CO_2$ laser, the above-mentioned Fourier type DOE and an f sin θ lens (f=127 mm). The spot diameter on an image plane is 171 μmφ. This f sin θ lens is produced by the teaching of the previously described Japanese Patent No.3,346,374 invented by the same inventor as the present invention.

EMBODIMENT 3

[Embodiment 3 (Fresnel Type DOE, Small Diverging Angles)]

[A. Properties of the Fresnel DOE]
Wavelength: 10.6 μm
Mode: $TEM_{oo}$
Beam diameter ($1/e^2$): 10 mm
Step number of heights: 16
Pixel size: a=20 μm, b=20 μm
Pixel number: R=1000 pixels, S=1000 pixels
DOE size: aR=20 mm, bS=20 mm
Number of divided beams: 49 (=7×7)
Diffracted beam pattern: FIG. 3, $P_1$=3.93701 mrad, $P_2$=3.93701 mrad, $\delta_1$=0.15748 mrad, $\delta_2$=0.07874 mrad Fresnel type lens: focal length f=−500 mm What is different from Embodiment 1 (Fraunhofer type) is that the DOE has a function as a lens. Since the DOE has the lens function, the DOE is called as Fresnel type. Embodiment 3 adds an f=−500 mm concave lens to the DOE. Of course, a convex lens can be added to the DOE instead of the concave lens.

Necessary resolutions U and V in x- and y-directions are $U=\delta_1$=0.15748 mrad, $V=\delta_2$=0.07874 mrad.

In Embodiment 3, λ/aR=λ/bS=0.53 mrad like Embodiment 1. These values of parameters of Embodiment 3 also satisfy the inequalities, $U<\lambda/aR$, $V<\lambda/bS$.

[B. Result of Designing of DOE]

DOE of Embodiment 3
  Diffraction rate: 82.2%
  Intensity fluctuation: 1.6%
  Largest noise intensity: 3.6%

[C. Laser processing apparatus]

A laser processing apparatus is manufactured by combining a $CO_2$ laser, the above-mentioned Fresnel type DOE and a flat/convex lens (f=127 mm, 50.8 mmφ, ZnSe). The spot diameter on an image plane is 171 μmφ.

FIG. 9 is a height (thickness) pattern of the DOE of Embodiment 3 designed by the teaching of the present invention. Amorphous islands forming parts of concentric circles are prevalent. The concentricity derives from the lens character which is inherent in Fresnel type DOEs. The reason why the island sizes are large is that the lattices $P_1$=3.93701 mrad and $P_2$=3.93701 mrad are small.

EMBODIMENT 4

[Embodiment 4 (Fresnel Type DOE, Large Diverging Angles)]
[A. Properties of the Fresnel DOE]
Wavelength: 10.6 μm
Mode: $TEM_{oo}$
Beam diameter(1/e$^2$): 10 mm
Step number of heights: 16
Pixel size: a=20 μm, b=20 μm
Pixel number: R=1000 pixels, S=1000 pixels
DOE size: aR=20 mm, bS=20 mm
Number of divided beams: 49 (=7×7)
Diffracted beam pattern: FIG. 3, $P_1$=39.37008 mrad, $P_2$=39.37008 mrad,
  $\delta_1$=0.15748 mrad, $\delta_2$=0.07874 mrad
Fresnel type lens: focal length f=−500 mm An object pattern is a fluctuating 7×7 dot pattern shown in FIG. 3. Embodiment 4 takes $P_1$=39.37008 mrad and $P_2$=39.37008 mrad for investigating the influence of a large diverging angle case. Embodiment 4 is similar to Embodiment 2 in the large diverging angles. Embodiment 4 differs from Embodiment 2 at the point of the DOE having a combined lens.

Embodiment 4 makes a DOE shown in FIG. 10. The DOE of FIG. 10 is different from FIG. 7 (Embodiment 2). FIG. 7 shows small dots aligning lengthwise and crosswise. FIG. 10 shows concentricity of dot arrangement. The concentric character derives from the lens combined.

Necessary resolutions in x- and y-directions are $U=\delta_1$=0.15748 mrad, $V=\delta_2$=0.07874 mrad.

In Embodiment 4, aR=20 mm (20000 μm), bS=20 mm (20000 μm) and λ=10.6 μm. Then, λ/aR=λ/bS=0.53 mrad. These values of parameters of Embodiment 3 also satisfy the inequalities, $U$(0.15748 mrad)$<\lambda/aR$(0.53 mrad), $V$(0.07874 mrad)$<\lambda/bS$(0.53 mrad).

[B. Result of Designing of DOE]

DOE of Embodiment 4
  Diffraction rate: 71.6%
  Intensity fluctuation: 1.7%
  Largest noise intensity: 3.5%

[C. Laser Processing Apparatus]

A laser processing apparatus is manufactured by combining a $CO_2$ laser, the Fresnel type DOE and an f sin θ lens (f=127 mm). A spot diameter on an image plane is 171 μmφ. The f sin θ lens has been produced by the teaching of our Japanese Patent No.3,346,374.

FIG. 10 is a height (thickness) pattern of the Fresnel type DOE of Embodiment 4 designed by the teaching of the present invention. Plenty of small dots forming parts of concentric circles are prevalent. The concentricity derives from the lens character which is inherent in Fresnel type DOEs. The reason why the dot sizes are small is that the lattices $P_1$=39.37008 mrad and $P_2$=39.37008 mrad are large. It is reasonable that FIG. 10 seems to be a superposition of a concentric lens pattern upon the FIG. 7 DOE pattern.

BRIEF DESCRIPTION OF THE DRAWINGS

FIG. 1 is an explanatory figure of a conventional diffractive optical element (DOE) and an image plane, the DOE consisting of repetition of identical unit patterns with P×Q pixels, having a degree of freedom of P×Q, making diffracted spots only on P×Q lattice points periodically two-dimensionally defined on the image plane, and allowing the Fast Fourier Transformation calculation (FFT) to calculate diffraction light intensity distribution $I_{pq}$ only at the P×Q lattice points.

FIG. 2 is an explanatory figure of an inventive diffractive optical element (DOE) and an image plane of the present invention, the diffractive optical element having not unit pattern but freely-determinable R×S pixels which require to integrate a diffraction integration equation for calculating diffraction light intensity distribution on the image plane instead of the FFT and the image plane, and having no concept of lattice points.

FIG. 3 is an angular distribution of forty-nine beams divided by the DOEs of Embodiments 1 to 4 of the present invention, wherein beam spots are not exactly on the lattice points and deviate from lattice points. Deviations are exaggerated for attracting attention. Deviations $\delta_1$ and $\delta_2$, which are the minima of necessary resolutions, are far smaller than lattice intervals (lattice constants). The conventional method was satisfied with a resolution as large as a lattice constant. On the contrary, the present invention, which produces many spots at arbitrary positions deviating from lattice points, requires far smaller resolution and can satisfy the rigorous requirement.

FIG. 4 is an intensity distribution of a $CO_2$ laser beam adopted by Embodiments 1 to 4 in a two-dimensional representation. The intensity distribution is assumed to be a Gaussian distribution.

FIG. 5 is a DOE pattern designed by the teaching of Embodiment 1 of the present invention for producing diffraction spots ($P_1$=3.93701 mrad) of FIG. 3. Thickness variation is represented by white-black tone variation. There is no repetition of partial patterns in the DOE. There is no concept of unit patterns which are identical small patterns.

FIG. 6 is a picture of diffracted beam spots on an image plane, which are produced by diffracting a $CO_2$ laser beam by the DOE designed by Embodiment 1, wherein a side of the diffracted square pattern is 39.75 mrad. Spots appear not on exact lattice points but on distorted lattice points which are similar to the deformed lattice pattern of FIG. 3. The beam intensity of the spots is uniform and the power of the divided beams is uniform.

FIG. 7 is another DOE pattern designed by Embodiment 2 for producing another object diffracted beam pattern of the FIG. 3 pattern ($P_1$=39.37008 mrad) multiplied by 10. Since the object pattern is ten times as large as the FIG. 3 pattern, the size of the pattern of the DOE is reduced to one tenth of the first DOE of FIG. 5. Like FIG. 5, the thickness distribution of the DOE is represented by variation of white-black monochromatic tones.

FIG. 8 is a picture of diffracted beam spots on an image planet, which are produced by another DOE designed by Embodiment 2 for making an object diffraction pattern ($P_1$=39.37008 mrad). The size of the diffracted beam picture is 331.25 mrad. Fluctuation of beam spot positions seems to be smaller than the previous diffraction pattern of FIG. 6 (Embodiment 1). FIG. 8 shows that the DOE satisfies the purpose of reviving the object diffraction pattern. The reason why the fluctuation is reduced in FIG. 8 is that the ratio of $\delta_1$ and $\delta_2$ to $P_1$ and $P_2$ is one tenths (1/10) of Embodiment 1. The size of the spots is diminished because the ratio of $\delta_1$ and $\delta_2$ to $P_1$ and $P_2$ are reduced to 1/10 of Embodiment 1 similarly.

FIG. 9 is a pattern of a DOE of Embodiment 3 which is made by unifying a Fraunhofer type DOE with a converging lens for producing an image beam pattern with fluctuation (position deviation) like Embodiment 1. Thickness distribution of the converging DOE of Embodiment 3, which is Embodiment 1 (P1=3.93701 mrad) plus the converging lens, is represented by white-black varying monochromatic tones. There is no square unit pattern in the DOE. Concentric patterns are obscurely hidden in the DOE. Superposition of the converging lens produces implicit concentric fringes. Pitches of repetition of the DOE are large, since object spots have narrow intervals.

FIG. 10 is a pattern of another Fresnel type DOE of Embodiment 4 which is also made by unifying a Fraunhofer type DOE with a converging lens for making a beam spot group which deviates from lattice points like Embodiment 2. Namely, the DOE of Embodiment 4 is built with the Embodiment 2 DOE ($P_1$=39.37008 mrad) and the converging lens. Thickness distribution of the Embodiment 4 DOE is represented by variation of white-black monochromatic tones. There is no unit pattern in the DOE. Superposition of the lens vanishes unit patterns and makes the concentric patterns. Pitches of repetition of the DOE pattern are small, since object spots have wide intervals ($P_1$=39.37008 mrad).

DESCRIPTION OF SYMBOLS

Figure 1:
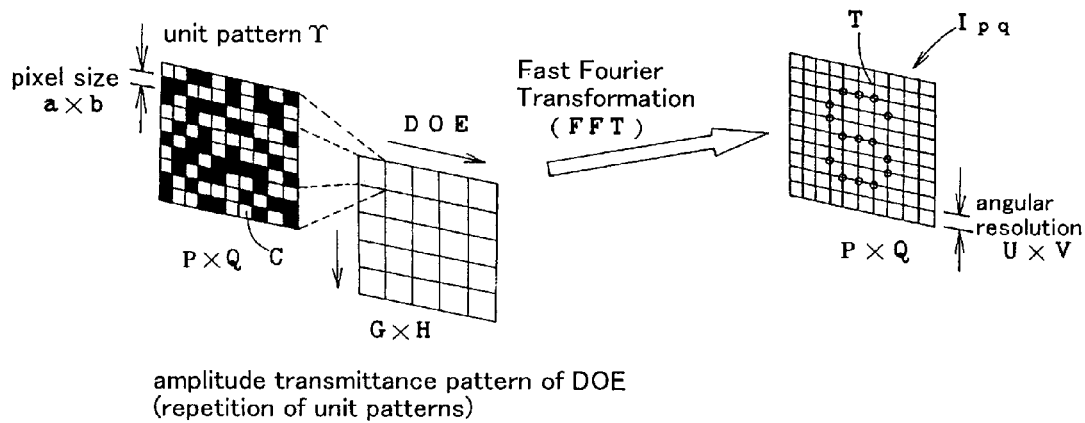
[FIG. 1]
Figure 2:
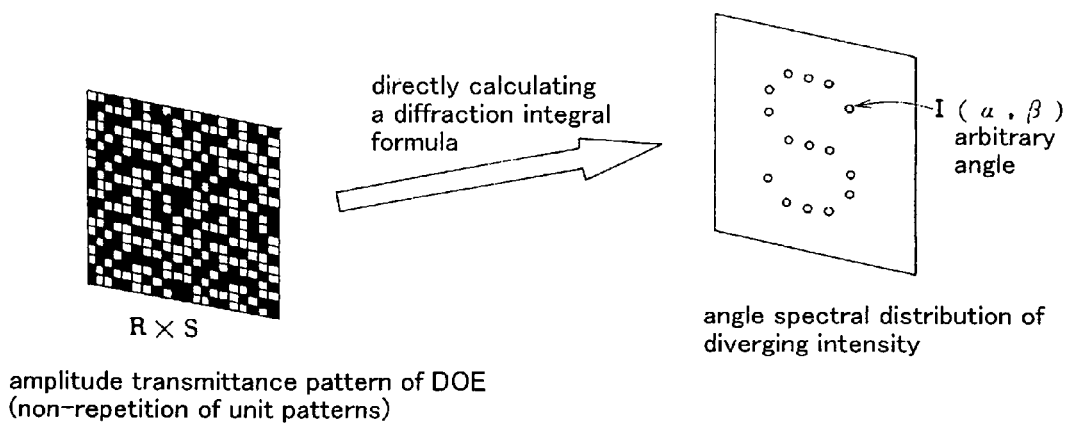
[FIG. 2]
Figure 3:
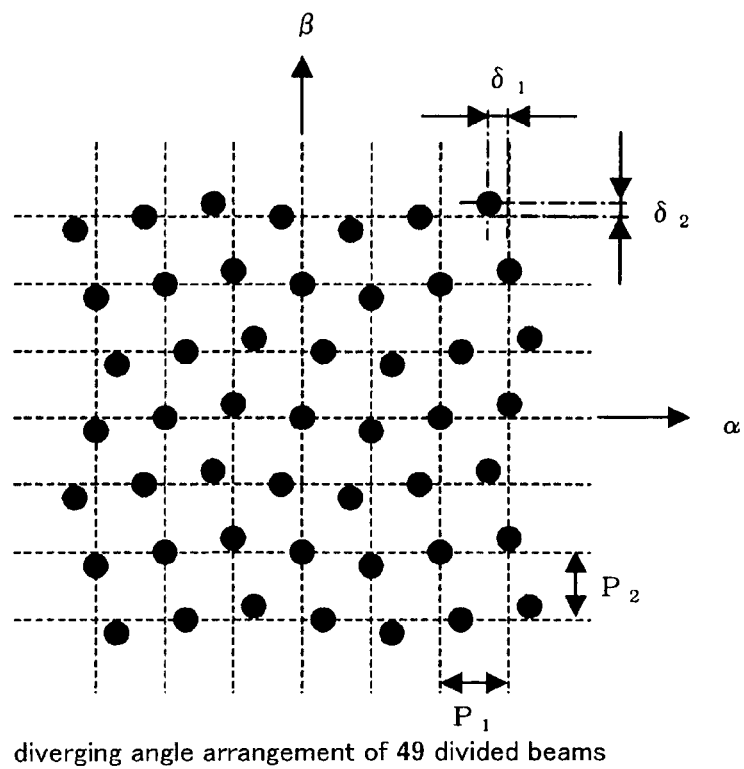
[FIG. 3]
Figure 4:
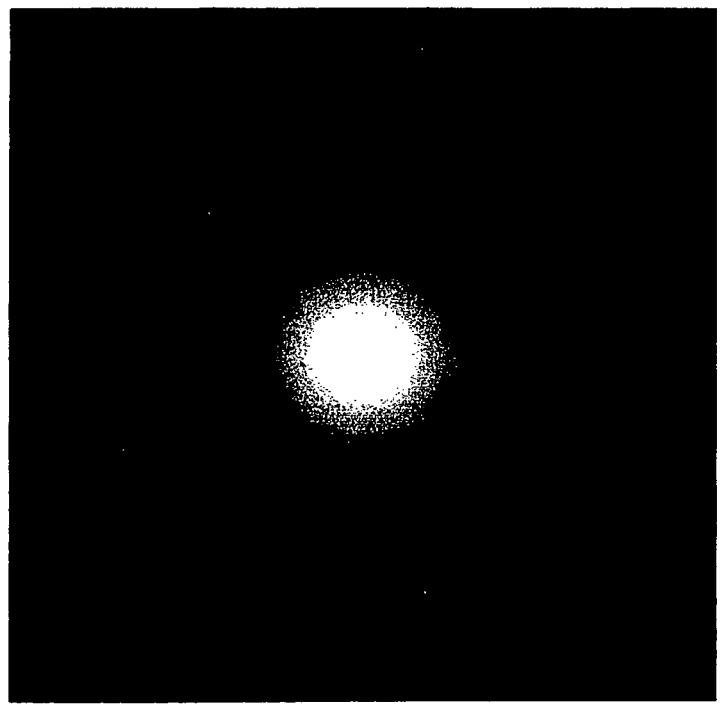
[FIG. 4]
Figure 5:
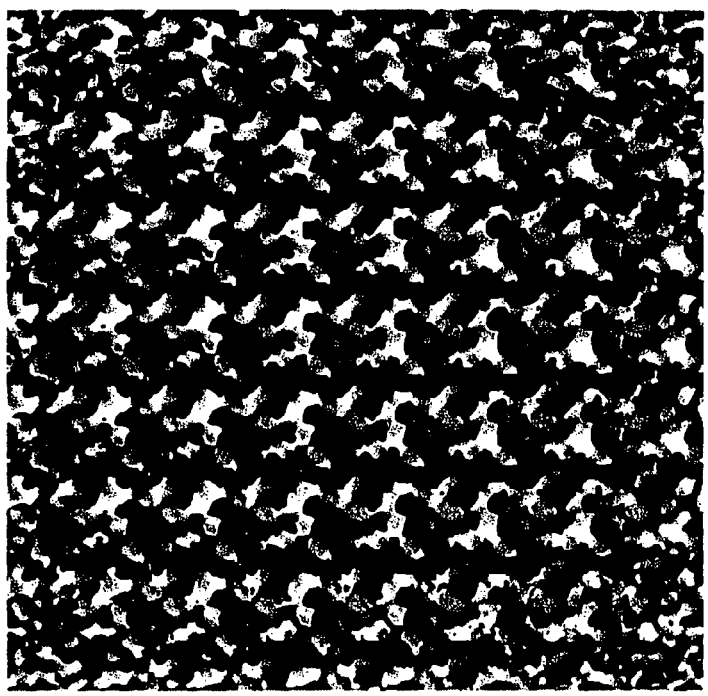
[FIG. 5]
Figure 6:
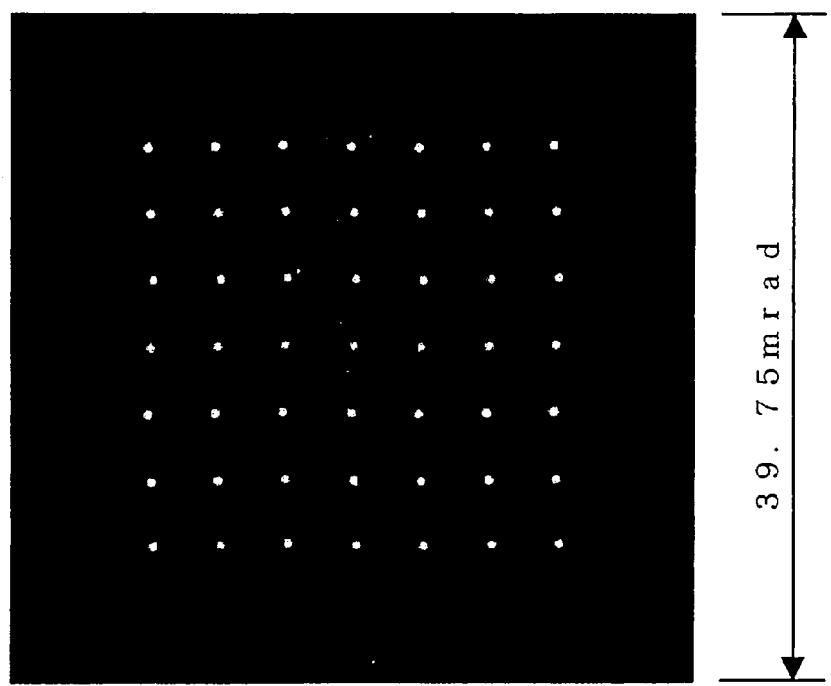
[FIG. 6]
Figure 7:
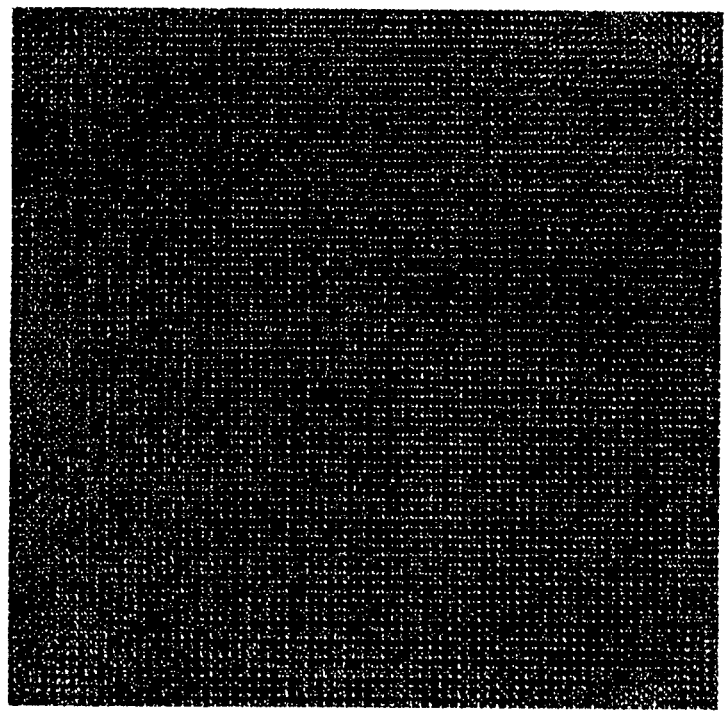
[FIG. 7]
Figure 8:
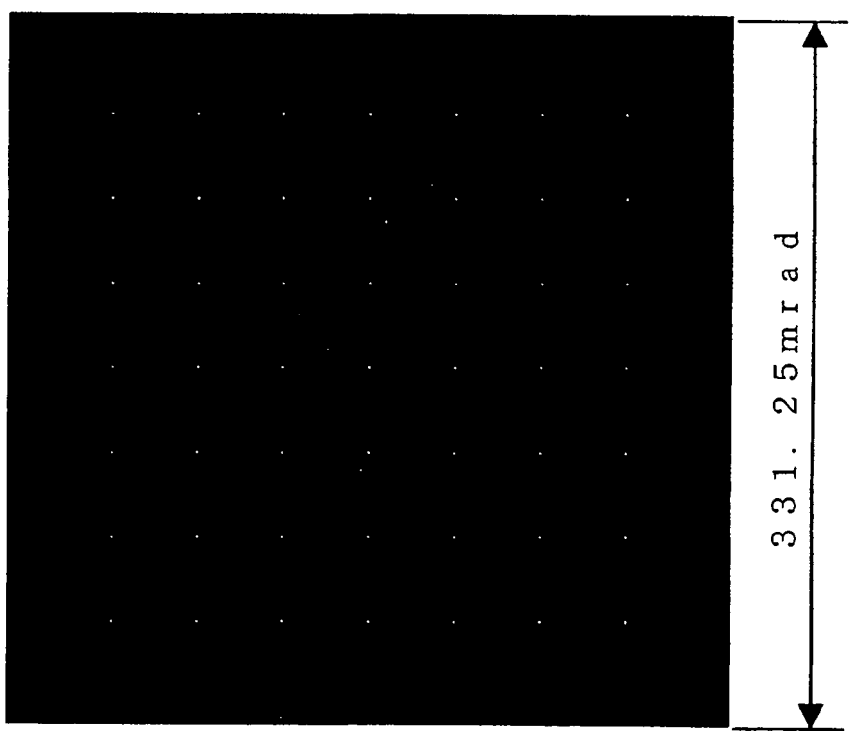
[FIG. 8]
Figure 9:
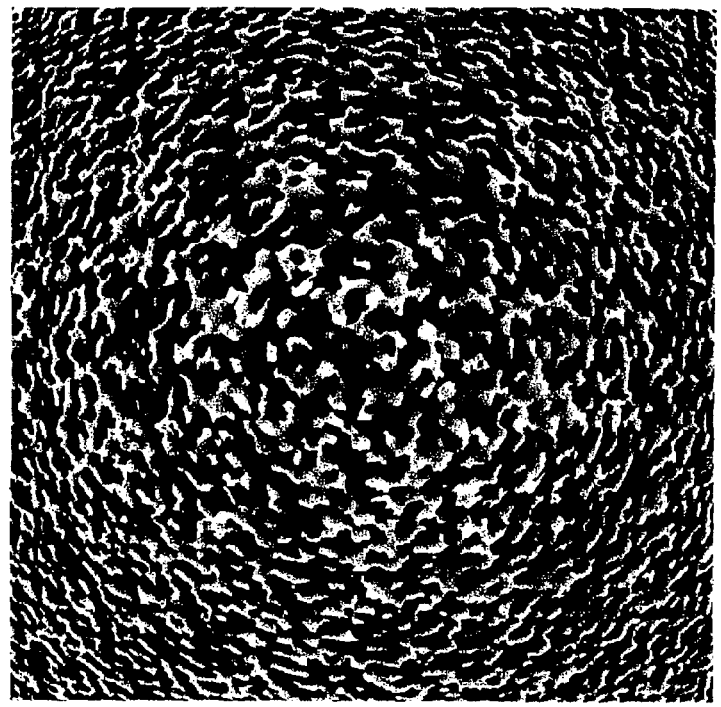
[FIG. 9]
Figure 10:
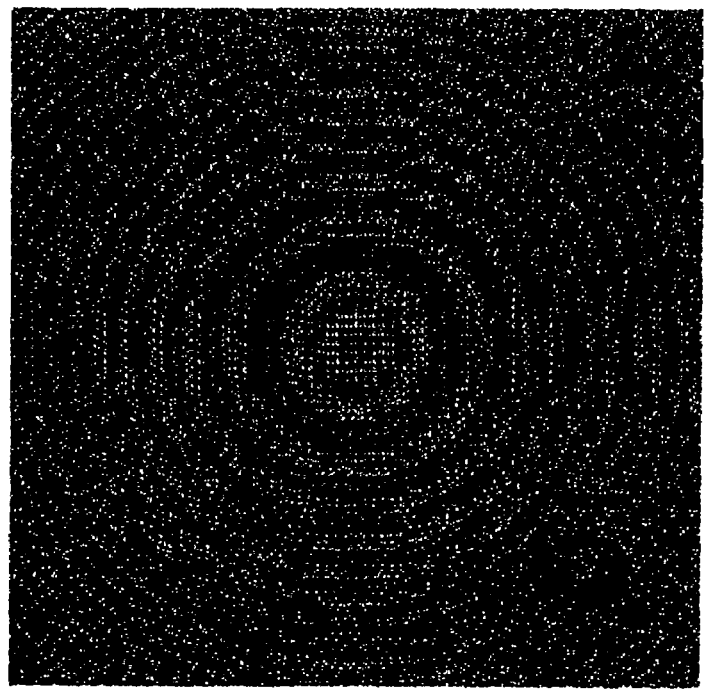
[FIG. 10]

C: pixel (picture element)
Υ: unit pattern
DOE: diffractive optical element
FFT: the Fast Fourier Transformation
a: x-direction size (width) of a pixel
b: y-direction size (length) of a pixel
P: number of pixels aligning in an x-direction
Q: number of pixels aligning in a y-direction
p: x-direction diffraction angle order of beams diffracted by a DOE just on regularly aligning lattice points (discrete)
q: y-direction diffraction angle order of beams diffracted by a DOE just on regularly aligning lattice points (discrete)
$W_{pq}$: complex amplitude of a beam diffracted in a (p, q) direction by a DOE (zero for other than integers (p, q))
$I_{pq}$: intensity of a beam diffracted in a (p, q) direction by a DOE
k: number of diffracted beams
$m_k$: diffraction order of the k-th diffracted beam
$t_{mn}$: amplitude transmittance of the (m, n)-th pixel of a DOE
λ: wavelength of a laser beam
Λ: size of a unit pattern on a DOE (=aP, bQ)
P: x-direction pixel number in a unit pattern
Q: y-direction pixel number in a unit pattern
α: x-direction diffraction angle of a beam diffracted by a DOE (continual value)
β: y-direction diffraction angle of a beam diffracted by a DOE (continual value)
W(α, β): complex amplitude of a beam diffracted in a (α, β) direction by a DOE (continual value)
I(α, β): intensity of a beam diffracted in a (α, β) direction by a DOE (continual value)
U: x-direction angular resolution of diffracted beams
V: y-direction angular resolution of diffracted beams
R: x-direction aligning pixel number of a DOE
S: y-direction aligning pixel number of a DOE
G: x-direction aligning unit pattern number in a DOE (=R/P)
H: y-direction aligning unit pattern number in a DOE(=S/Q)
E: merit function
$W_1$, $W_2$, $W_3$: weights multiplied to squares of deviations of parameters in a merit function
R': x-direction aligning pixel number of a DOE which is enlarged from an original DOE by adding vacant pixels ($t_{mn}$=0) at peripheries
S': y-direction aligning pixel number of a DOE which is enlarged from an original DOE by adding vacant pixels ($t_{mn}$=0) at peripheries

The invention claimed is:

1. A diffractive optical element (DOE) comprising:
R×S lengthwise and crosswise aligning pixels $\{C_{mn}\}$ (m=1, 2, ..., R; n=1, 2..., S) of a size of a×b which have g (=$2^s$: s: integer) different values of thicknesses $\{d_{mn}\}$ varying within one wavelength of laser light λ and have g (=$2^s$: s: integer) different values of complex amplitude transmittance $\{t_{mn}\}$ given by $t_{mn}=\exp(j2\pi(n-1)d_{mn}/\lambda)$, where j is an imaginary number unit and where n is a diffractive index of the DOE,
complex amplitude W(α, β) of a beam diffracted in a direction of a horizontal angle α and a vertical angle β being calculated not by the Fast Fourier Transform but by, $$W(\alpha, \beta) = \operatorname{sinc}\left(\frac{a\alpha}{\lambda}\right)\operatorname{sinc}\left(\frac{b\beta}{\lambda}\right)\sum_m \sum_n t_{mn}\exp\{-jk(ma\alpha + nb\beta)\}$$

where summations are carried out for all the pixels in the DOE and some or all of the diffraction beam angles (α, β) are non-lattice points defined on an object plane,
in the case of diverging an incident laser beam into K diffracted beams, the k-th beam having angles ($\alpha_k$, $\beta_k$) to an incident beam axis, the angles ($\alpha_k, \beta_k$) of the k-th diffracted beam (k=1, 2, ..., K) satisfying equations, $$\sin \alpha_k = m_k U,$$

$$\sin \beta_k = n_k V,$$

where $m_k$ and $n_k$ are integers having no common divisor and U and V are the positive greatest common divisors (measures) for $\{\sin \alpha_k\}$ and $\{\sin \beta_k\}$ for k=1, 2, ..., K, and both or either of the greatest common divisors U and V being smaller than a quotient $\lambda/aR$ or $\lambda/bS$ of the laser wavelength $\lambda$ divided by a size aR or bS of the DOE, that is, $$U < \lambda/aR,$$

$$V < \lambda/bS.$$

2. The diffractive optical element according to claim 1, wherein the DOE is a Fraunhofer type DOE having an infinitely long focal length (f=∞).

3. The diffractive optical element according to claim 1, wherein the DOE is a Fresnel type DOE having a definite focal length (f<∞).

4. The diffractive optical element according to any one of claims 1 to 3, wherein calculations of diffracted beam intensity are carried out by summing the whole terms of all the pixels and calculations of noise are carried out the Fast Fourier Transform for alleviating noise calculation time, and the transmittance distribution $\{t_{mn}\}$ is determined for satisfying a restriction of desired diffraction beam intensity and another restriction of reduction of noise.

\* \* \* \* \*